United States Patent [19]
Younkin

[11] 3,815,358
[45] June 11, 1974

[54] IMPULSE CONTROL SENSOR SYSTEM

[75] Inventor: Harry A. Younkin, Cumberland, Md.

[73] Assignee: Hercules Incorporated, Wilmington, Del.

[22] Filed: Sept. 25, 1972

[21] Appl. No.: 292,228

[52] U.S. Cl. .................................. 60/234, 60/254
[51] Int. Cl. .............................................. F02k 9/04
[58] Field of Search ............ 60/254, 234; 102/49.3, 102/49.8; 73/116, 117.4

[56] References Cited
UNITED STATES PATENTS
3,701,256  10/1972  Pelham et al. .................... 60/254 X FOREIGN PATENTS OR APPLICATIONS
723,040  2/1955  Great Britain ..................... 60/254

Primary Examiner—Carlton R. Croyle
Assistant Examiner—Robert E. Garrett
Attorney, Agent, or Firm—James W. Peterson

[57] ABSTRACT

The invention is an impulse control sensor system for a solid propellant powered rocket motor, said system utilizing a sensing deflagrating fuse responsive to the burning front of solid propellant, a thrust control means and a transducer means communicatively connecting said fuse and said thrust control means.

7 Claims, 5 Drawing Figures

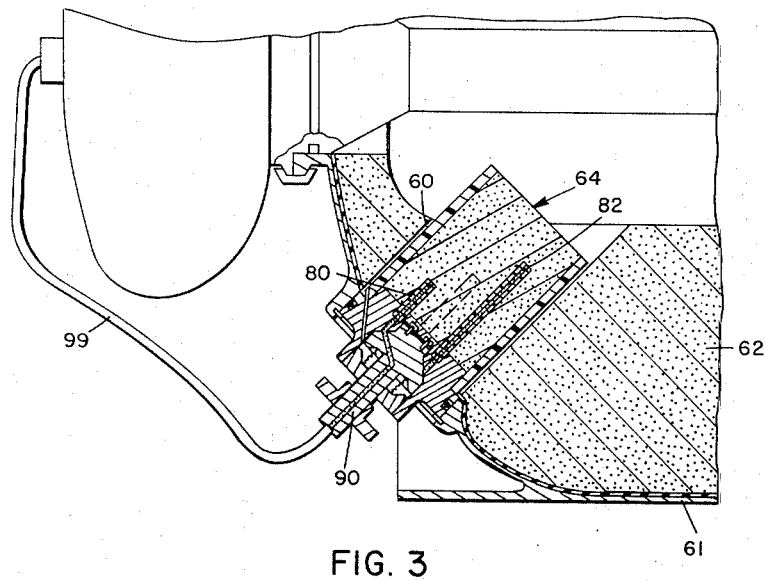
FIG. 3
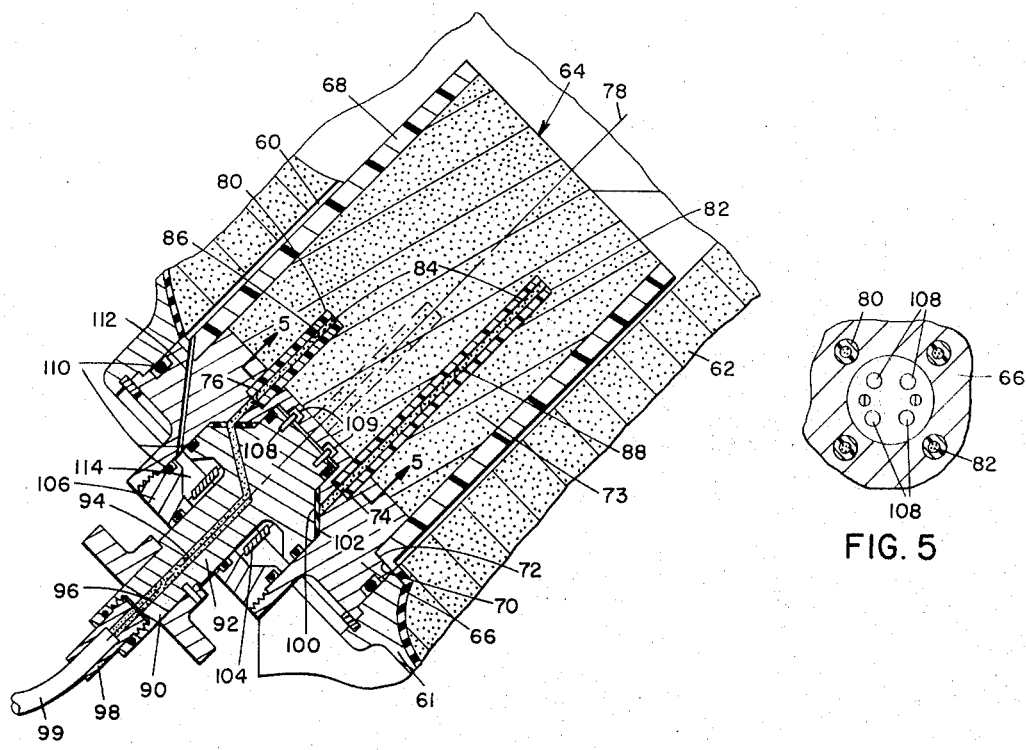
FIG. 4
FIG. 5

IMPULSE CONTROL SENSOR SYSTEM

This invention relates to a simple impulse control sensor system for a solid propellant powered rocket motor in which a deflagrating fuse is employed as sensing element. In another aspect this invention relates to a process for controlling the impulse of a rocket motor employing a deflagrating fuse as an element for measuring the amount of propellant consumed.

In the expanding applications of solid propellant rockets to meet the demands of sophisticated mission requirements deemed necessary of future space and defensive ballistic rocket systems, the need for providing precise control of impulse energy and auxiliary control systems is quite important. Many techniques and systems have been devised for terminating combustion, reversing thrust or changing the course of a rocket. However, few simple, low-cost techniques are available for sensing the energy level of a rocket motor and for providing a signal at a precise moment to effect control or actuation of an impulse control system.

Most impulse sensing techniques are based upon the principle of either measuring motor combustion pressure, rocket acceleration, or operating time, which are dependent upon sub-systems having sophisticated components, electronic circuits or computing systems. Such systems are costly, and have reliability, storage and operational problems resulting, in part, from the wide temperature extremes and environmental conditions in which such systems must operate.

Accordingly, it is the object of this invention to provide a simple sensing device which can be employed to operate an impulse control system in a solid propellant powered rocket motor at predetermined times which is low in cost, has good operating characteristics, long term storage capability over wide temperature extremes and environmental conditions and does not require electrical circuitry or components for reliable operation.

Other objects of this invention will, in part, be obvious and will, in part, appear hereinafter. For a complete understanding of the nature and objects of this invention, reference is made to the following detailed description and drawings.

In accordance with this invention an impulse control sensor system is provided for solid propellant powered rocket motors comprising at least one sensing element containing a deflagrating fuse embedded in solid propellant contained within the rocket motor to be controlled. The sensing element is communicatively connected to a transducing means containing a deflagrating fuse which in turn is connected to an impulse control means such as a liquid quench system. The impulse control system is made operative upon receipt of a signal initiated by burning of the deflagrating fuse.

The impulse control sensor system of this invention is based simply upon the principle of correlating motor performance based upon known solid propellant rocket motor ballistics with the predetermined conditions at which it is desired to control thrust. Specifically, the percentage of propellant consumed in operation of the rocket motor is correlated to time, energy level or flight characteristic through known ballistic characteristics of the rocket motor. For example, the total impulse energy $I_T$ of a rocket motor can be expressed as the product of (a) the weight of propellant consumed $W_p$ and (b) the specific impulse energy of the propellant, $I_{sp}$ in accordance with the following equation ($I_T = W_p I_{sp}$). By correlating the weight of propellant consumed, $W_p$, to the web distance burned, $W_b$, a desired impulse energy level for the rocket motor can be programmed before flight by locating a sensing element in the propellant at the web distance commensurate with the desired impulse increment. Web distance is the thickness of propellant measured normal to the burning surface. Thus, by embedding a sensing element within a propellant web at a web distance commensurate with the weight of propellant required to provide the desired impulse, a simple means of providing signals for the activation of a thrust control system is provided without costly, sophisticated equipment.

Multiple sensing elements and a switch to provide selection between the various sensing elements embedded at various depths in the propellant web can also be employed. A selector switch or safe arm switch is employed in the system to connect a selected sensing element to the impulse control device for operation at the predetermined condition during firing of the rocket motor.

The impulse control sensor system of this invention is more fully illustrated in the drawings which follow. In the drawings, like numbers refer to like parts where applicable.

FIG. 3 is a partial longitudinal view partly in section illustrating another embodiment of the thrust control system of this invention in which a selector switch is employed with multiple deflagrating fuse sensing elements embedded in a removable solid propellant charge inserted into the rocket motor.

FIG. 4 is an enlarged detailed view partly in section of the burning distance probe assembly of FIG. 3.

FIG. 5 is a detailed view along lines 5—5 of FIG. 4.

Figure 1:
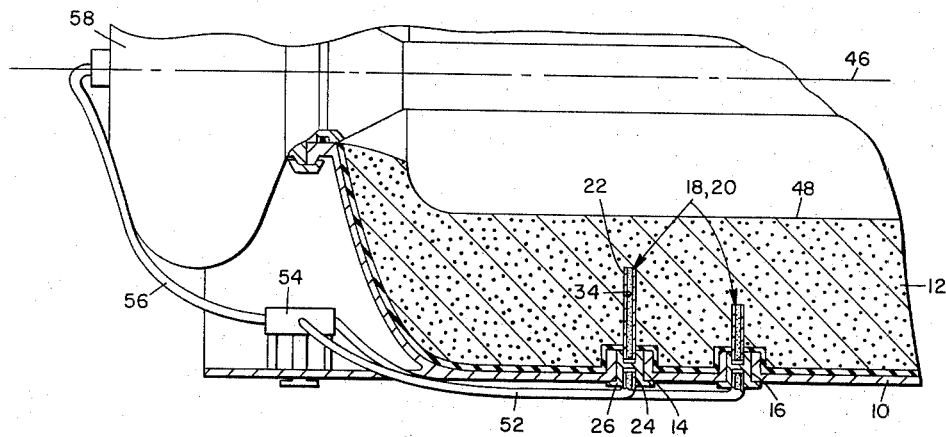
FIG. 1 is a partial longitudinal view partly in section illustrating an impulse control sensor system of this invention in which a deflagrating fuse is embedded directly into the solid propellent web of the rocket motor to function as a propellant burn distance sensing element.
Figure 2:
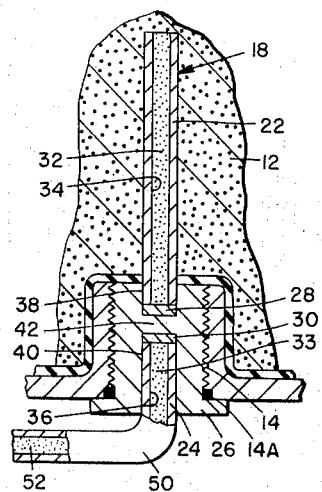
FIG. 2 is an enlarged detail view of the sensing element of FIG. 1.

In FIGS. 1 and 2 an embodiment of the thrust control system of this invention is illustrated. Rocket motor case 10 is partially filled to the desired internal configuration with propellant 12. The rocket motor case 10 has two threaded bosses 14, 16. Sensing element 18 comprising support rods 22, 24, a through bulkhead initiator 26, a donor charge 28, a receiving charge 30 and a deflagrating fuse 32 contained within cavities 34, 36 within each support rod 22, 24 are threadably secured within bosses 14, 16 and sealed by O-rings such as 14a. Donor charge 28 is secured at the base of support rod 22 within through bulkhead initiator 26 and is contiguous with deflagrating fuse 32. Receiving charge 30 is positioned at the base of support rod 24 within through bulkhead initiator 26 and is contiguous with deflagrating fuse 33. Through bulkhead initiator 26 has two partial longitudinal cavities 38, 40 in axial alignment and separated by diaphragm 42 which is an integral part of through bulkhead initiator 26. Support rods 22 and 24 are secured in cavities 38 and 40 respectively. In the embodiment of FIG. 1, support tube 22 containing deflagrating composition 32 is in direct contact with propellant charge 12. Support tube 22 is positioned at an angle of 90° with the longitudinal axis 46 of the rocket motor case 10. In the embodiment shown, the support tubes 22 and 24 are positioned normal to the propellant burning surface 48. Support tube 24 is coupled to sensor transfer line 50, which is a combustion resistant tubular casing containing a deflagrating fuse 52. Sensor transfer line 50 is in turn connected to selector switch 54. Selector switch 54 can be designed to have several operative positions which can be preselected in conjunction with one of several burn distance sensing elements 18, 20. The selector switch is connected through a signal transfer line 56 to an impulse control system such as a liquid quench system 58. Signal transfer line 56 is of like construction to transfer line 50.

OPERATION OF THE THRUST CONTROL SYSTEM

The operation of the thrust control system is as follows. Prior to firing of the rocket motor the selector switch is preset for thrust termination to occur when a predetermined amount of propellant has been consumed. After the rocket motor is fired, the propellant 12 burns perpendicularly to the propellant surface 48 until the burning surface reaches support rod 22 containing deflagrating composition 32. Deflagrating fuse 32 burns at a very high rate, but generally below the rate of sound transmission, and initiates explosion of donor charge 28. The shock wave resulting from explosion of donor charge 28 passes through diaphragm 42 and initiates explosion of receiving charge 30 which in turn initiates the deflagrating fuse 33 in support rod 24, and in turn the deflagrating fuse 52 in transfer line 50. Selector switch 54 is positioned selective to sensing element 18, and a deflagration is transmitted through line 56 to the initiator of the impulse control system 58, where the deflagrating burning front ignites the liquid quench pyrotechnic pressurizating charge (not shown) causing activation of the quench system. Ignition of the charge can be either directly by the deflagrating fuse or through a thin bulkhead initiator with a pyrotechnic output. Burning of the propellant 12 is terminated by the quench system 58 thereby terminating motor combustion and impulse. It is to be understood that the sequence of events from initiation of the deflagrating fuse 32 in support rod 22 until initiation of the impulse control system 58, takes place in from about 0.5 to 3 milliseconds.

In FIGS. 3 and 4 a second embodiment of the impulse control sensor system of this invention is illustrated. A burn distance probe sensing assembly 64 is shown inserted into a cavity 60 which extends through rocket motor case 61 and into propellant charge 62. The cavity in the rocket motor case 61 and the propellant charge 62 are in registering relationship. A burn distance sensing probe assembly 64 is inserted into cavity 60. The burn distance sensing probe assembly 64 consists of an aluminum closure head 66 and a phenolic cylinder 68 which is secured to peripheral surface 70 of the interior face 72 of closure head 66. The sensing probe assembly 64 is in the form of a cylinder which is closed at one end by closure head 66. A propellant charge 73 is secured in the open end of the cylinder. Closure head 66 has a series of cylindrical cavities 74, 76 extending through closure head 66. The cavities 74, 76 are spaced an equal distance from the center of the closure head, said cavities being symmetrically spaced about the central longitudinal axis 78 of the burning probe assembly which is also the central longitudinal axis of the closure head 66. Two sensing elements 80, 82 prepared from phenolic rods are bonded to the walls formed by the cavities 74, 76 in the forward end of closure head 66. A deflagrating fuse 84 is held within each cavity 86, 88 which extends throughout the length of each element 80, 82 respectively.

The selector switch 90 shown illustrates the selection principle and is only one of many configurations which can be employed to provide selection between sensing elements. The selector switch 90 consists of an aluminum body 92 having a cavity 94 therethrough. Cavity 94 contains a deflagrating fuse 96 and a connecting means 98 for connecting deflagrating fuse 96 to a deflagrating fuse transfer line 99 which is in turn connected to the impulse control system to be activated. Selector switch body 92 has a conical forward surface 100. Selector switch body 92 is slidably receivable into the aft-end of closure head 66. A rubber gasket 102 is bonded to forward surface 100 of selector switch 90. The selector switch body 92 is retained and maintained in a selected position by means of a compression spring 104, an aluminum plate closure 106, and detent pins 108. Rubber O-rings 110 and rubber gasket 102 are provided as shown in the assembly to provide pressure seals and prevent gas leakage when the selector switch is positioned operative to a sensing element as shown in FIG. 4. In the operative position the entire deflagrating fuse train 84, 96, 99 is in a communicating relationship for the selected sensing element position 80.

The selector switch assembly shown provides for five positions, one position for each of the four sensing elements and a null position employed when activation of the transfer circuit is not desired. Positioning is provided by pulling the body 92 of switch 90 against spring 104 and rotating the switch body 92 to the desired position, which position is then maintained by means of compression springs 104, detent pins 108 in switch body 92 and receptacle holes 109 in probe closure head 66 as shown in FIGS. 4 and 5. Two detent pins for each location are used to facilitate easy operation and maintain alignment of the plunger body 92. Coincident with the detent pin location for each sensing element is a marking on the closure 66 which is visible and labeled. The selected sensing element to be operative is aligned with a mark on plunger body 92 such that the sensing element position selected can visually be determined from the position of the selector switch.

Prior to rocket motor ignition the desired sensor location is selected and continuity between the sensing element and the impulse control device quench system) to be activated is accomplished by rotating the selector switch 92 to align the deflagrating fuse 96 within the cavity in the selector switch 90 with the deflagrating composition 86 in sensing element 80. Selector switch 90 is in operative relationship to sensing element 80 and locked in operative position with detent pins 108. As an additional feature to maintain the selector switch 90 in the selected position and also provide added safety to ensure sealing of all the other sensors not selected, motor pressure is allowed to bleed from the pressurized rocket motor chamber through port 112 to pressurize cavity 114 defined between closure plate 106 and selector switch body 92 causing additional force to be applied to the switch body 92 and gasket 102 to effect positive sealing.

The impulse control sensor system heretofore described in FIGS. 1-5 employs a combination of a deflagrating fuse and mechanical features in the system circuitry. This circuitry is completely non-electrical.

The following examples further illustrate the impulse control sensor system and operational principles of this invention.

EXAMPLES 1-3

Three tests were conducted at 77° F. conditions to experimentally verify the operational principles of this invention using a multi-sensor probe and a test apparatus designed for a partial burn of a propellant. The test setup consists of a burn distance probe sensor assembly of the type illustrated in FIGS. 3-5 mounted inside the motor assembly of a radially burning 10 pound charge (TPC) motor. The TPC motor with an impulse control sensor probe assembly attached is connected to a partial burn apparatus which includes a base plate, a powder charge plate and a shear disc. The multi-sensor probe consists of an all-phenolic cup assembly with two sensing elements made of a strand of 0.040-inch diameter aluminum sheathed pyrotechnic deflagrating fuse (fast burning SCID Hivelite No. 300, 113 as manufactured by McCormick-Selph) bonded into 0.250-inch diameter phenolic rods and placed at the several different web distances measured from the forward-end of the probe charge. Composite propellant which has been well characterized ballistically is cast around the charge (TPC) grains are cast in a cylindrical configuration from propellant having the same composition as that employed in the multi-sensor probe. The TPC Grains are inhibited on the outside diameter. The grains have a 4.5-inch outside diameter, a 1.8-inch diameter centerport, are 7 inches long and weight 6.0 pounds. All the tests were set for termination at 0.9-inch web distance from the propellant surface of the multi-sensor probe charge.

Operation of the test consists of simultaneous ignition of the propellant of both the motor and probe charge. Burning continues until the propellant burning front reaches the selected sensing element at which time the deflagrating fuse composition is ignited. The fuse burning front is transferred through a transfer spacer, containing deflagrating composition of the same type, to the test fixture powder charge. The test fixture powder charge is ignited by the burning fuse composition, causing confined burning of the powder charge and high pressure to be developed. The high pressure results in shearing of the shear disc, allowing the powder plate, the base plate containing the probe, and the motor grain to be ejected from the TPC case and dumped into a tank of water and quenched. The recovered burn distance sensing probe and motor grain are evaluated for burning rate effects and the ability of the sensing system to activate quench of the propellant at predetermined times based on the known ballistic performance of the rounds.

The results of these tests are summarized in Table I.

TABLE I
PARTIAL BURN TEST SUMMARY

| | | | $C_r$,% |
|---|---|---|---|
| Number Tests | 3 | | |
| Propellant, type | Composite | | |
| Conditioning Temperature, °F. | 77 | | |
| Sensor Position from surface of propellant, inches | .90 | | |
| Pressure, psia | | 870 Avg. | .21 |
| Burning time, sec. | | 1.73 .9017 | |
| Sensor web distance location, inches (measured from original surface of charge) | | 3.93 | .54 (.27)* |
| Propellant Consumed, ($W_p$), lbs. | | .9077 | .67 (.27)* |
| TPC Web burned (inches) (measured from original surface of charge) | | | .53 (.28)* |
| Integral of pressure-time $\int Pdt$ psia-sec | | 1505.3 | .58 (.34)* |
| Total Impulse Variation ($I_T = W_p I_{sp}$) based upon data and $I_{sp\ (cr)} = .21\%$ | | | |

*Based upon results from two tests.

The foregoing tests show uniform web burning between the probe charges and TPC propellant grain with no measurable difference in burning rate. The difference between the sensor location and TPC web consumed can be attributed to the time bias due to the test set up and accuracy with which the burned propellant surface can be measured. Activation of the propellant ejection and quench system is rapid with less than 2 milliseconds lapsing from ignition of the deflagrating composition until shear disc failure results. There is, however, a time bias between the time the shear disc fails and the time the propellant is immersed in water which adds error and variation in the data. The coefficient of variation ($C_r$) in burning web distance decreases as the web distance to the sensor location is increased; therefore, the accuracy of the impulse control sensor system of this invention can be improved in rocket motor having large propellant web thickness.

The weight of propellant consumed in these tests is correlatable to the propellant web distance burned and the burning surface area. Total impulse can be expressed as the product of the weight of propellant consumed and the propellant specific impulse. Test result indicate the coefficient of variation in impulse sensin to be expected employing the burn distance sensin system of this invention will be from 0.27 to 0.6.

What I claim and desire to protect by letters Pate is:

1. An impulse control sensor system for a solid p pellant powered rocket motor, comprising:
   sensing means embedded in propellant within solid propellant powered rocket motor to be c trolled, said sensing means comprising at least sensing deflagrating fuse, said sensing mean sponding to substantial contact of said se means with a burning front of solid prope within the rocket motor;
   impulse control means connected to the r motor to control the thrust and impulse rocket motor; and,
   transducer means communicatively connectii sensing means to said impulse control mean tivate said impulse control means in resp sensing of the burning front of solid prope 2. A sensor system as defined in claim 1 whei sensing deflagrating fuse is embedded directly solid propellant powering the rocket motor tc trolled.

3. A sensor system as defined in claim 2 wh transducer means comprises:
   a donor explosive charge in contact with sa means;
   a receiver explosive charge;

a transducer deflagrating fuse connecting said receiver explosive charge and said impulse control means; and, diaphragm means separating said donor explosive charge and said receiver explosive charge, said donor charge being detonated by the sensing element, producing a shock front, said shock front initiating detonation of the receiving charge, initiating burning of the transducer deflagrating fuse to activate said impulse control means.

4. A sensor system as defined in claim 3 wherein said impulse control means is a liquid quench system, comprising a liquid quench reservoir containing a liquid quench and pressurization means which is responsive to the burning of the transducer deflagrating fuse for activation and transferring the liquid quench from the reservoir to the interior of the rocket motor.

5. A sensor system as defined in claim 1 wherein said sensing means includes a plurality of sensing deflagrating fuses and is embedded in solid propellant contained within a sensing assembly which is inserted into a cavity provided within the motor casing of the rocket motor being controlled.

6. A sensor system as defined in claim 5 wherein said transducer means includes a selector switch containing a transducer deflagrating fuse, said selector switch providing for communicative connection of said impulse control means with a desired sensing deflagrating fuse or for rendering said transducer deflagrating fuse inoperative with undesired sensing deflagrating fuses.

7. A sensor system as defined in claim 6 wherein said impulse control means is a liquid quench system, comprising a liquid quench reservoir containing a liquid quench and pressurization means which is responsive to the burning of the transducer deflagrating fuse for activation and transferring the liquid quench from the reservoir to the interior of the rocket motor.

* * * * *

PO-1050
(5/69)

UNITED STATES PATENT OFFICE
CERTIFICATE OF CORRECTION

Patent No. 3,815,358　　　Dated　June 11, 1974

Inventor(s)　Harry A. Younkin　(Case 1)

It is certified that error appears in the above-identified patent and that said Letters Patent are hereby corrected as shown below:

Col. 4, Line 52 of p.p.
 "device quench" -- should read -- "device(quench..."

Signed and sealed this 19th day of November 1974.

(SEAL)
Attest:

McCOY M. GIBSON JR.　　　　　C. MARSHALL DANN
Attesting Officer　　　　　　Commissioner of Patents